(12) United States Patent
Nichols et al.

(10) Patent No.: US 10,729,999 B2
(45) Date of Patent: Aug. 4, 2020

(54) WAVE SEAL FOR FILTER ELEMENT

(71) Applicant: Parker-Hannifin Corporation, Cleveland, OH (US)

(72) Inventors: John Nichols, Oxford, MS (US); Josh Smith, Olive Branch, MS (US); Randy Harbur, Germantown, TN (US); Daniel Copley, Oxford, MS (US)

(73) Assignee: Parker-Hannifin Corporation, Cleveland, OH (US)

( * ) Notice: Subject to any disclaimer, the term of this patent is extended or adjusted under 35 U.S.C. 154(b) by 251 days.

(21) Appl. No.: 15/772,828

(22) PCT Filed: Nov. 2, 2016

(86) PCT No.: PCT/US2016/059980
§ 371 (c)(1),
(2) Date: May 2, 2018

(87) PCT Pub. No.: WO2017/079191
PCT Pub. Date: May 11, 2017

(65) Prior Publication Data
US 2018/0318745 A1    Nov. 8, 2018

Related U.S. Application Data

(60) Provisional application No. 62/250,532, filed on Nov. 4, 2015, provisional application No. 62/293,545, filed on Feb. 10, 2016.

(51) Int. Cl.
*B01D 35/153* (2006.01)
*B01D 46/24* (2006.01)
*B01D 46/00* (2006.01)

(52) U.S. Cl.
CPC ....... *B01D 46/2414* (2013.01); *B01D 35/153* (2013.01); *B01D 46/0004* (2013.01);
(Continued)

(58) Field of Classification Search
CPC ........... B01D 46/2414; B01D 46/0005; B01D 46/0004; B01D 35/153; B01D 2201/347;
(Continued)

(56) References Cited

U.S. PATENT DOCUMENTS 5,137,696 A * 8/1992 Hitachi ................... F01N 3/281
422/180
6,235,195 B1 * 5/2001 Tokar ..................... B01D 46/10
210/238

(Continued)

FOREIGN PATENT DOCUMENTS

WO    WO 2014/210541    12/2014

OTHER PUBLICATIONS

International Search Report and Written Opinion of PCT/US2016/059980 dated Mar. 9, 2017, 11 pages.

*Primary Examiner* — Minh Chau T Pham
(74) *Attorney, Agent, or Firm* — Renner, Otto, Boisselle & Sklar, LLP

(57) ABSTRACT

A filter element includes a filter media having opposite first and second faces, and an outer face extending in a longitudinal direction perpendicular from the first face to the second face. An undulating sealing element is directly bonded to the outer face at a location closer to and offset from the first face. The undulations of the sealing element define an offset region of the outer face of the filter media from the first face, the offset region being defined by an amplitude of the undulations. The filter element may be incorporated into a filter assembly including the filter element enclosed by a filter housing. The sealing element may be made of urethane and be compressible within a mating groove in the filter housing.

45 Claims, 7 Drawing Sheets

(52) U.S. Cl.
CPC .... *B01D 46/0005* (2013.01); *B01D 2201/295* (2013.01); *B01D 2201/296* (2013.01); *B01D 2201/347* (2013.01); *B01D 2271/02* (2013.01)

(58) Field of Classification Search
CPC .......... B01D 2271/02; B01D 2201/296; B01D 2201/295
USPC ....... 55/357, 498, 502, 521, 385.3; 210/238, 210/470, 492, 493.4, 497.1, 493.1, 493.2
See application file for complete search history.

(56) References Cited

U.S. PATENT DOCUMENTS

| | | | |
|---|---|---|---|
| 7,905,936 B2* | 3/2011 | Coulonvaux | B01D 46/0023 55/357 |
| 7,967,886 B2 | 6/2011 | Schrage et al. | |
| 8,246,707 B2 | 8/2012 | Xu et al. | |
| 9,283,508 B2* | 3/2016 | Yoshino | B01D 46/0005 |
| 10,376,823 B2* | 8/2019 | Krull | B01D 46/527 |
| 10,456,727 B2* | 10/2019 | Wall | B01D 46/2411 |
| 2008/0041026 A1 | 2/2008 | Engel et al. | |
| 2010/0064646 A1 | 3/2010 | Smith et al. | |
| 2014/0251895 A1 | 9/2014 | Wagner | |
| 2014/0260143 A1* | 9/2014 | Kaiser | B01D 46/103 55/501 |
| 2015/0096931 A1 | 4/2015 | Jensen | |
| 2015/0101295 A1* | 4/2015 | Thompson | B01D 35/153 55/482 |

\* cited by examiner

WAVE SEAL FOR FILTER ELEMENT

RELATED APPLICATIONS

This application is national stage application pursuant to 35 U.S.C. § 371 of PCT/US2016/059980 filed on Nov. 2, 2016, which claims the benefit of U.S. Provisional Application No. 62/250,532 filed Nov. 4, 2015, and U.S. Provisional Application No. 62/293,545 filed Feb. 10, 2016, which are incorporated herein by reference.

FIELD OF INVENTION

The present invention relates generally to fluid filter assemblies, and more particularly to sealing elements for providing a seal of a filter element against a filter housing as may be used in connection with media air filtration products.

BACKGROUND OF THE INVENTION

A variety of applications employ fluid filter assemblies. Such applications include, for example, hydraulic systems, fuel delivery systems, coolant systems, and engine lubrication systems. Filter assemblies may be used to filter any type of fluid, such as, for example, air, gasoline, diesel fuel, lubricating oil, water, coolant fluid, and others. Air filtration products in particular are used in a variety of such applications, such as for example in the turbo engine components of a vehicle engine.

Conventional fluid filter assemblies may include a filter media, such as a sheet of fibrous filter material. In exemplary configurations, the filter media may be fluted, or folded to form a plurality of parallel pleats or folds. The filter element may be received within in a filter housing, which is capped by a filter head or filter cover. In an example of an air filter assembly, air flows through an inlet in the filter head, through the filter media, and out through an outlet of the filter housing. The inlet and outlet passages in the filter head and/or filter housing direct fluid flow, such as air flow, into and out of the filter element. The air or other fluid passes through the filter element, which separates particles and other contaminants from the fluid which is then returned to the operating system. In order for the filter element to properly function and not leak, a positive seal must be maintained with the filter head and filter housing. Typically, air filter elements use an o-ring supported seal along a plane in a straight cut or radial seal gland design. A sloped or angled seal gland design has been used, for example, as shown in U.S. Pat. No. 7,494,017 for "Filter Element With Off-Axis End Cap", issued to the assignee of the present application. Another example of filter sealing is shown in U.S. Pat. No. 8,916,044 entitled "Filter Element Wave Gland Seal," also issued to the assignee of the present application.

There remains potential for improvement, however, in achieving effective sealing with sufficient filtration capacity, while maintaining ease of installation and replacement of the filter element. There also have been issues of high cost in connection with manufacturing various filtration products, and air filtration products in particular. Previously, the filter element had been designed as an injection molded plastic lower cover with a co-injection molded seal. Although generally effective, such manufacturing process of a co-injection molded cover and seal elements has been somewhat costly.

SUMMARY OF THE INVENTION

The present invention provides a filter element with an enhanced sealing configuration, and an improved method of manufacturing such filter element. The present invention relates generally to media air filtration products with improved sealing, ease of installation and replacement with increased filtration capacity. The present invention has been shown to have comparable restriction and dust holding capacity as compared to conventional configurations, with up to 99.9% efficiency in filtering performance. An improved manufacturing process further reduces the cost of manufacturing as compared to conventional manufacturing processes.

An aspect of the invention is a filter element for use in a filter assembly including the filter element contained within a filter housing. In exemplary embodiments, the filter element includes a filter media having a first face and a second face opposite to the first face, and further including an outer face extending in a longitudinal direction that is perpendicular to the first and second faces from the first face to the second face. An undulating sealing element is fixed to the outer face of the filter media at a location closer to the first face than the second face, and offset from the first face. The sealing element may be made of urethane. The sealing element may be directly bonded to the filter media during the manufacturing process. The undulations of the sealing element have an amplitude along the longitudinal direction from a minimum position closest to the second face to a maximum position closest to the first face. The undulations of the sealing element may define an offset region of the outer face of the filter media from the first face, the offset region being defined by the amplitude of the sealing element. The filter element may be incorporated into a filter assembly including the filter element enclosed by a filter housing covered by a filter head, and may be used particularly in connection with air filtration products.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
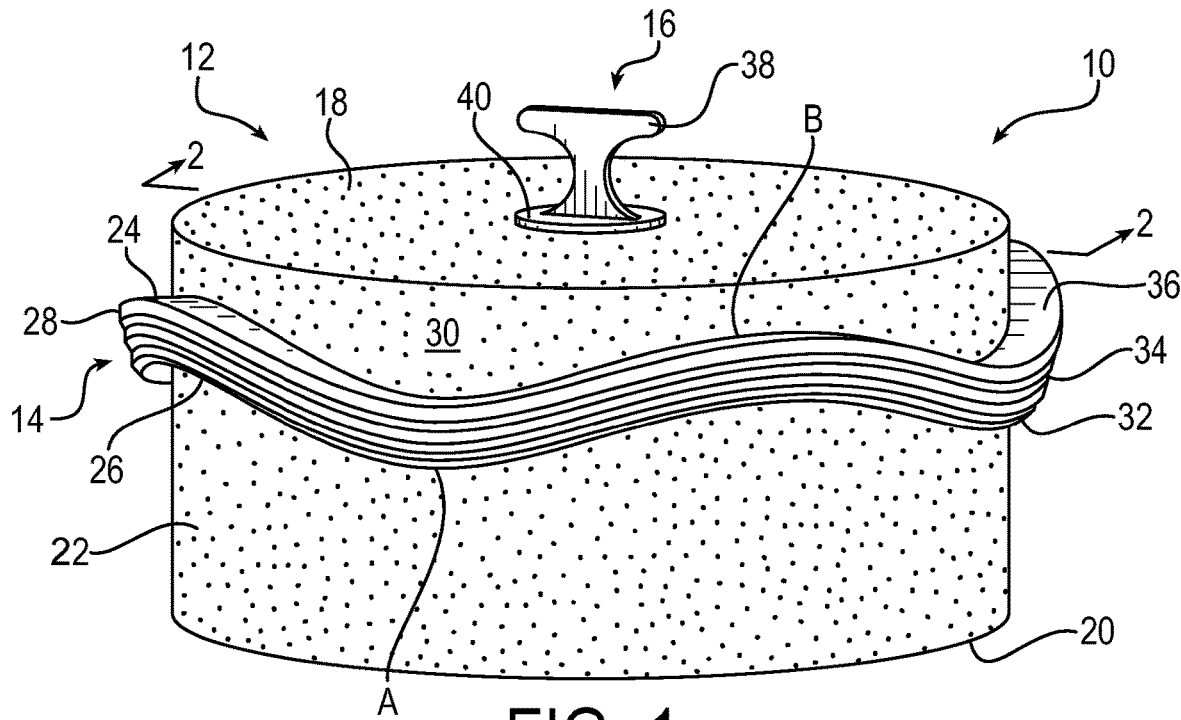
FIG. 1 is a drawing depicting an isometric view of a first exemplary filter element in accordance with embodiments of the present invention.

Embodiments of the present invention will now be described with reference to the drawings, wherein like reference numerals are used to refer to like elements throughout. It will be understood that the figures are not necessarily to scale.

Figure 2:
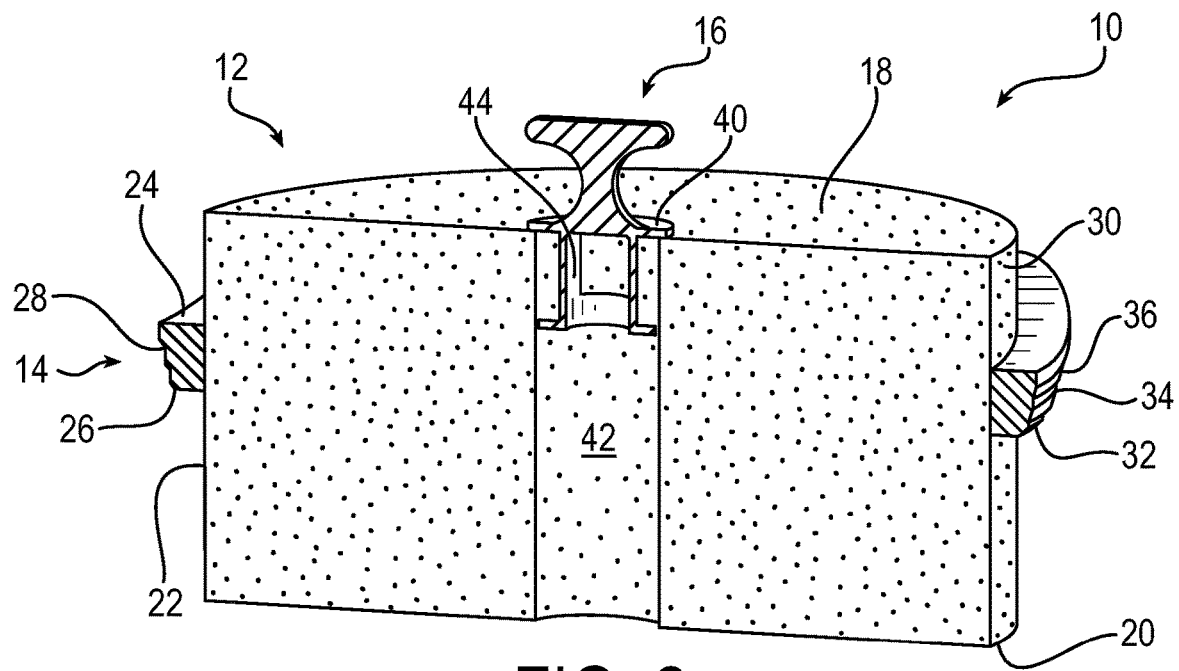
FIG. 2 is a drawing depicting a side cross-sectional view of the exemplary filter element of FIG. 1.

FIG. 1 is a drawing depicting an isometric view of a first exemplary filter element 10 in accordance with embodiments of the present invention. FIG. 2 is a drawing depicting a side cross-sectional view of the exemplary filter element 10 of FIG. 1. Accordingly, like reference numerals are used in connection with like elements in FIGS. 1 and 2. The filter element 10 is described largely in connection with air filtration products. It will be appreciated, however, that the described principals and configurations may be employed in any suitable filtration application.

As further described below, in exemplary embodiments, the filter element includes a filter media having a first face and a second face opposite to the first face, and further including an outer face extending in a longitudinal direction that is perpendicular to the first and second faces from the first face to the second face. An undulating sealing element is fixed to the outer face of the filter media at a location closer to the first face than the second face, and offset from the first face. The sealing element in particular may be directly bonded to the filter media. The undulations of the sealing element have an amplitude along the longitudinal direction from a minimum position closest to the second face to a maximum position closest to the first face. The undulations of the sealing element may define an offset region of the outer face of the filter media from the first face, the offset region being defined by the amplitude of the sealing element. The filter element may be incorporated into a filter assembly including the filter element enclosed by a filter housing covered by a filter head.

Referring to FIGS. 1 and 2, the filter element 10 generally includes a filter media 12, a sealing element 14, and a gripping component 16. In the example of FIGS. 1 and 2, the filter media 12 is configured in a cylindrical form with a generally circular cross-section, although as further shown below any suitable cross-sectional shape may be employed. The filter media 12 runs in a longitudinal direction along a longitudinal axis from a first or top face 18 to an opposite second or bottom face 20. As used herein, the longitudinal direction is a direction perpendicular to the first and second faces, and generally is the direction of flow of fluid from the first face to the second face. Orientation terms such as "top" and "bottom" are employed for convenience of reference as to the particular orientations shown in the figures, although it further will be appreciated that the filter element 10 is not limited to any particular orientation (e.g., the depicted top and bottom may be reversed, or the filter element may be oriented horizontally, as may be suitable for a particular application). In a typical usage, air may flow into and from the first/top face 18, longitudinally through the body of the filter media 12, exiting from the second/bottom face 20. As the air flows through the filter media 12, contaminants become trapped in the filter media thereby filtering the air flow.

The filter media 12 has an outer surface 22 that runs in the longitudinal direction perpendicular to the first and second faces between the first and second faces 18 and 20. The outer surface 22 may be fluted or pleated as is conventional in the art. In addition, the outer surface 22 may include layer of material that is impermeable to fluid that flows through the filter media from the first face to the second face. For example, the outer surface may be configured as felt or fibrous wrap that is impervious to the fluid flow. In an alternative embodiment, the outer surface may include a coating of impermeable material, such as a urethane coating or similar material. The sealing element 14 is fixed to the outer surface 22 of the filter media 12. The sealing element may be made of urethane, or any other suitable sealing material as are known in the art for filter seals. Urethanes is a particularly suitable material in the manner of its compressibility or "squishiness" within a housing of the filter assembly. In this manner, urethane provides for an enhanced sealing function as compared to conventional configuration. In exemplary embodiments, the sealing element is fixed to the outer surface 22 by direct bonding during the manufacturing process, the manufacturing process being described in more detail below. By such direct bonding, the sealing element is fixed to the filter media without application of additional components, such as an adhesive or coating layer applied to the filter media. The direct bonding further obviates any need for forming a groove or otherwise post-processing the filter media to accept the sealing element. Accordingly, the direct bonding of the sealing element 14 to the filter media 12 provides for an effective fixation without more complex and costly processing typically associated with conventional configurations.

The sealing element 14 may include a first or top edge 24, a second or bottom edge 26 (see comment above as to orientation terms), and an outer side 28 that is opposite to an inner side that is bonded to the filter media. The sealing element may 14 may be configured as an undulating sealing element, also referred to as a wave seal, in which at least one of the first or second edges 24 or 26 is non-planar. Because of the undulating configuration, the sealing element 14 may be referred to as such a wave seal. In the example of FIGS. 1 and 2, both of the first and second edges are non-planar. Also in the example of FIGS. 1 and 2, the wave seal configuration has four undulations, and it will appreciated that such configuration is an example and the precise number of undulations may be varied. In various embodiments, the number of undulations generally may be two or more, and may in certain circumstances be varied based on the size of the filter element. The presence of the undulations provides for enhanced durability against wear due to pressures in the filtration system as compared to conventional straight o-ring seals. The undulating geometry of the sealing element can be considered to have an amplitude along the longitudinal direction of the filter element 10, from a minimum position "A" closest to the second face 20 to a maximum position "B" at closest to the first face 18.

In addition as further shown in the example of FIGS. 1 and 2, the sealing element 14 is located on the outer surface 22 of the filter media 12 offset from the first or top face 18 and/or second or bottom face 20 on the air inlet side. The offset region of the filter media is denoted in FIGS. 1 and 2 by reference numeral 30, and is generally defined by the amplitude of the undulations of the sealing element. The expanse of the offset region 30 may vary based on the overall size of the filter media 12 for any particular application. In exemplary embodiments, the sealing element 14 at the maximum position B may be offset at a range of approximately 5%-15% from the top face 18 and/or bottom face 20 relative to an entire longitudinal length of the filter media. The sealing element 14 at the minimum position A correspondingly may be located at a range of approximately 40%-60% from the top face 18 and/or bottom face 20 relative to the entire longitudinal length of the filter media. It will be appreciated that the precise amplitude of the sealing element 14 undulations from the minimum position A to the maximum position B, as well as the precise resulting expanse of the offset region 30 of filter media, may be varied as is suitable for any particular application. In addition, the figures for purposes of illustration show the undulations being offset from the first face 18. It will be appreciated that the descriptive terms "top" and "bottom" with respect to the faces of the filter element are used for purposes of illustration based on the orientation in the figures. More generally, therefore, the terms first face and second face are opposing faces that are interchangeable and reversible, and the filter element may be oriented in ways other than vertical, with the undulations being offset from either of the opposing faces, without regard to any specific orientation of the filter element.

The outer side 28 of the sealing element 14 may have a non-planar or otherwise non-uniform configuration to enhance the effectiveness of the seal. In the example of FIGS. 1 and 2, the outer side 28 has essentially a stepped configuration with a plurality of ridges 32, 34, and 36 of differing diameters relative to a central longitudinal axis of the filter element. In particular, in an exemplary stepped configuration the diameter relative to the central longitudinal axis of ridge 32 is less than a diameter of ridge 34, and the diameter of ridge 34 is less than a diameter of ridge 36. Any suitable number of ridges may be employed.

The gripping component 16 generally is an optional component. In exemplary embodiments, a center passage or hole through the filter media formed during manufacturing may be sealed using an expanding foam, as is known in the art.

In exemplary embodiments that may include the gripping component, the gripping component 16 may be attached to the first face of the filter media, and include a grip 38 that is shaped for easy gripping by a user. The grip 38 may extend to a base plate 40 that rests against the first/top face 18 of the filter media. As seen best in the cross-sectional view of FIG. 2, the filter media 12 defines a hollow central region 42. The base plate 40 prevents contaminants from entering into the hollow central region 42 of the filter media. The gripping component 16 further may include an anchor 44 that extends from the base plate 40 and down into a portion of the hollow central region 42 of the filter media. The anchor 44 secures the gripping component 16 to the filter media 12. The grip may extend from the base plate 40 away from the first face 18 of the filter media. To install the filter element 10, a user may simply hold the filter element by the grip 38 of the gripping component 16, and push the filter element down into a canister or other housing that houses the filter element during use. A reverse operation may be performed to remove the filter element 10 for replacement. A user again may simply hold the filter element by the grip 38 of the gripping component 16, and pull the filter element out from the canister or other filter housing. The gripping component 16, therefore, provides for easy installation, removal, and replacement of the filter element 10.

Figure 3:
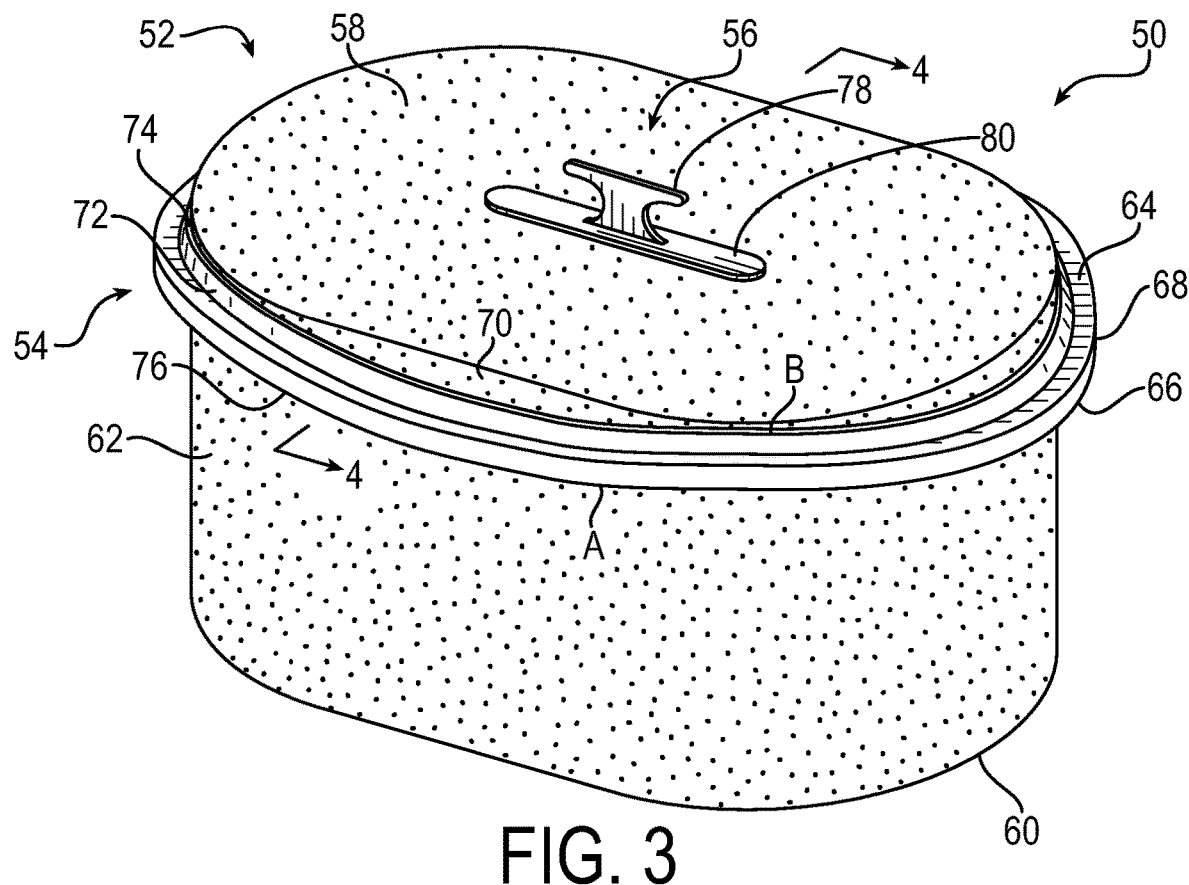
FIG. 3 is a drawing depicting an isometric view of a second exemplary filter element in accordance with embodiments of the present invention.
Figure 4:
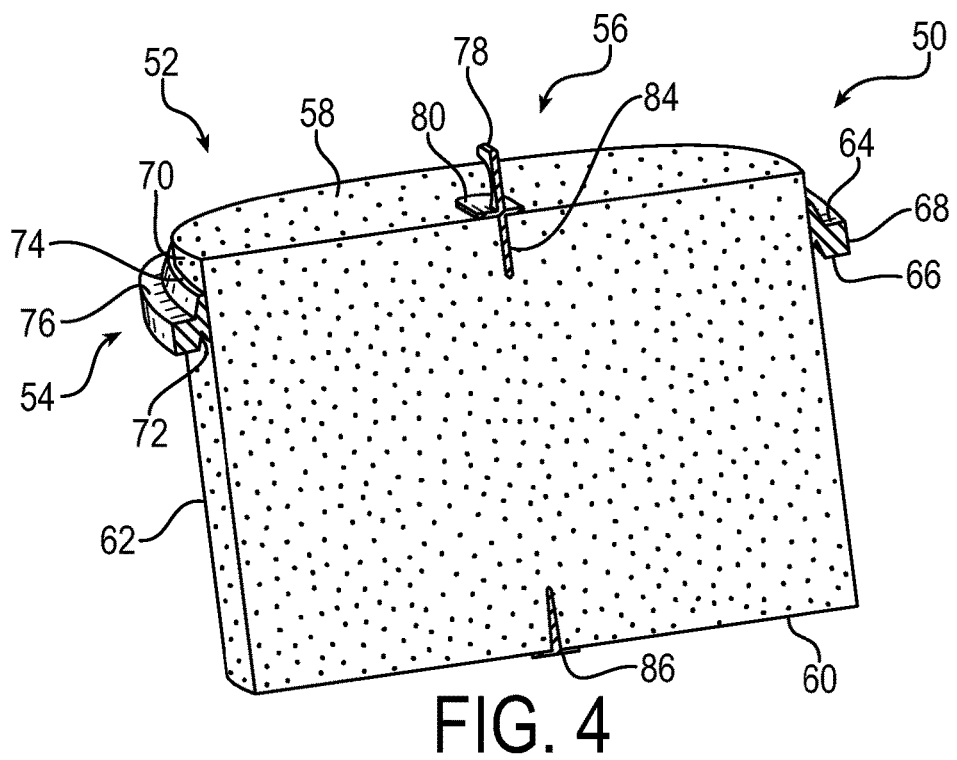
FIG. 4 is a drawing depicting a side cross-sectional view of the exemplary filter element of FIG. 1.

FIG. 3 is a drawing depicting an isometric view of a second exemplary filter element 50 in accordance with embodiments of the present invention. FIG. 4 is a drawing depicting a side cross-sectional view of the exemplary filter element 50 of FIG. 1. Accordingly, like reference numerals are used in connection with like elements in FIGS. 3 and 4. As further detailed below, the filter element 50 bears similarity in some respects to the filter element 10, with alternative configurations of certain elements as well.

The filter element 50 generally includes a filter media 52, a sealing element 54, and a gripping component 56. In the example of FIGS. 3 and 4, the filter media 52 is configured in a cylindrical form with a generally ovular cross-sectional area rather than circular. Again, any suitable cross-sectional shape may be employed depending upon the particular application. Other example cross-sectional shapes may include square, rectangular, hexagonal, or other suitable regular or non-regular shapes as may be warranted for a particular application.

Similarly to the first embodiment, the filter media 52 runs longitudinally or along a longitudinal axis from a first or top face 58 to an opposite second or bottom face 60 (see above comment regarding orientation terms). In a typical usage, air may flow into and from the first/top face 58, longitudinally through the filter media, exiting from the second/bottom face 60. As the air flows through the filter media 52, contaminants become trapped in the filter media thereby filtering the air flow. The filter media 52 has an outer surface 62 that runs in a longitudinal direction between the first and second faces 58 and 60. The outer surface 62 may be fluted or pleated as is conventional in the art. The sealing element 54 is fixed to the outer surface 62 of the filter media 52. As described with respect to the previous embodiment, the sealing element may be fixed to the outer surface 62 by direct bonding during the manufacturing process, the manufacturing process being described in more detail below.

The sealing element 54 may include a first or top edge 64, a second or bottom edge 66 (see comment above as to orientation terms), and an outer side 68 that is opposite to an inner side that is bonded to the filter media. Similarly to the previous embodiment, the sealing element may 54 may be configured as an undulating sealing element or wave seal, in which at least one or both of the first or second edges 64 or 66 is non-planar. The undulations may be configured similarly as in the previous embodiment with any number of undulations as is suitable. In addition, the undulating geometry of the sealing element again can be considered to have an amplitude along the longitudinal direction of the filter element 50, from a minimum position "A" closest to the second face 60 to a maximum position "B" closes to the first face 58, or vice versa with either face being deemed the first face and the other face being deemed the second face. The sealing element 54 is located on the outer surface 62 of the filter media 52 so as to define an offset region 70 that extends from the first or top face 58 and/or bottom face 60. The amplitude of the wave seal undulations between the minimum and maximum positions A and B, as well as the expanse of the offset region 70, may be configured comparably as described with respect to the first embodiment.

The outer side 68 of the sealing element 54 may have an alternative configuration relative to the first embodiment. Note that either of the configurations of the outer side 28 or 68 may be used or interchanged with any cross-sectional shape or configuration of filter media. In other words, the configurations of outer sides 28 or 68 of the sealing element are not limited for use with any particular arrangement of the filter media or other filter element components. The configuration of outer side 68 of the sealing element 54 has an alternative non-planar or non-uniform configuration to enhance the effectiveness of the seal and to provide for ease of manufacturing. In the example of FIGS. 3 and 4, the outer side 58 has essentially a grooved configuration with an undercut forming a stem 72 that extends from a sealing base 74, and the stem supports a sealing block 76. The grooved configuration of the sealing element 54 may cooperate with an opposing grooved configuration of an inner surface of the canister or filter housing to provide and enhanced sealing configuration.

The gripping component 56 of the second embodiment may be configured comparably as in the first embodiment. The gripping component may include a grip 78 that is shaped for easy gripping by a user. The grip 78 may extend to a base plate 80 that rests against the first/top face 58 of the filter media. In the example of FIGS. 3 and 4, the base plate 80 may be elongated into an ovular configuration similarly as with the cross-sectional shape of the filter media 52. Also in the example of FIGS. 3 and 4, the gripping component 56 further may include an anchor 84 that extends down into a portion filter media 52, thereby securing the gripping component 56 to the filter media 22. FIG. 4 also shows a cap 86 on the second/bottom face 60 to prevent contamination into a central portion of the filter media where the gripping component 56 is located. It will be appreciated that either of the configurations of the gripping components may be used or interchanged with any cross-sectional shape or configuration of filter media. In other words, the configurations of the gripping components 16 or 56 are not limited for use with any particular arrangement of the filter media or other filter element components, including the sealing components.

Installation and replacement of the filter element 50 also may be performed comparably as in the previous embodiment. To install the filter element 50, a user may simply hold the filter element by the grip 78 of the gripping component 56, and push the filter element down into a canister or other housing that houses the filter element during use. A reverse operation may be performed to remove the filter element 50 for replacement. A user again may simply hold the filter element by the grip 78 of the gripping component 56, and pull the filter element out from the canister or other filter housing. The gripping component 56, therefore, provides for easy installation, removal, and replacement of the filter element 60.

Figure 5:
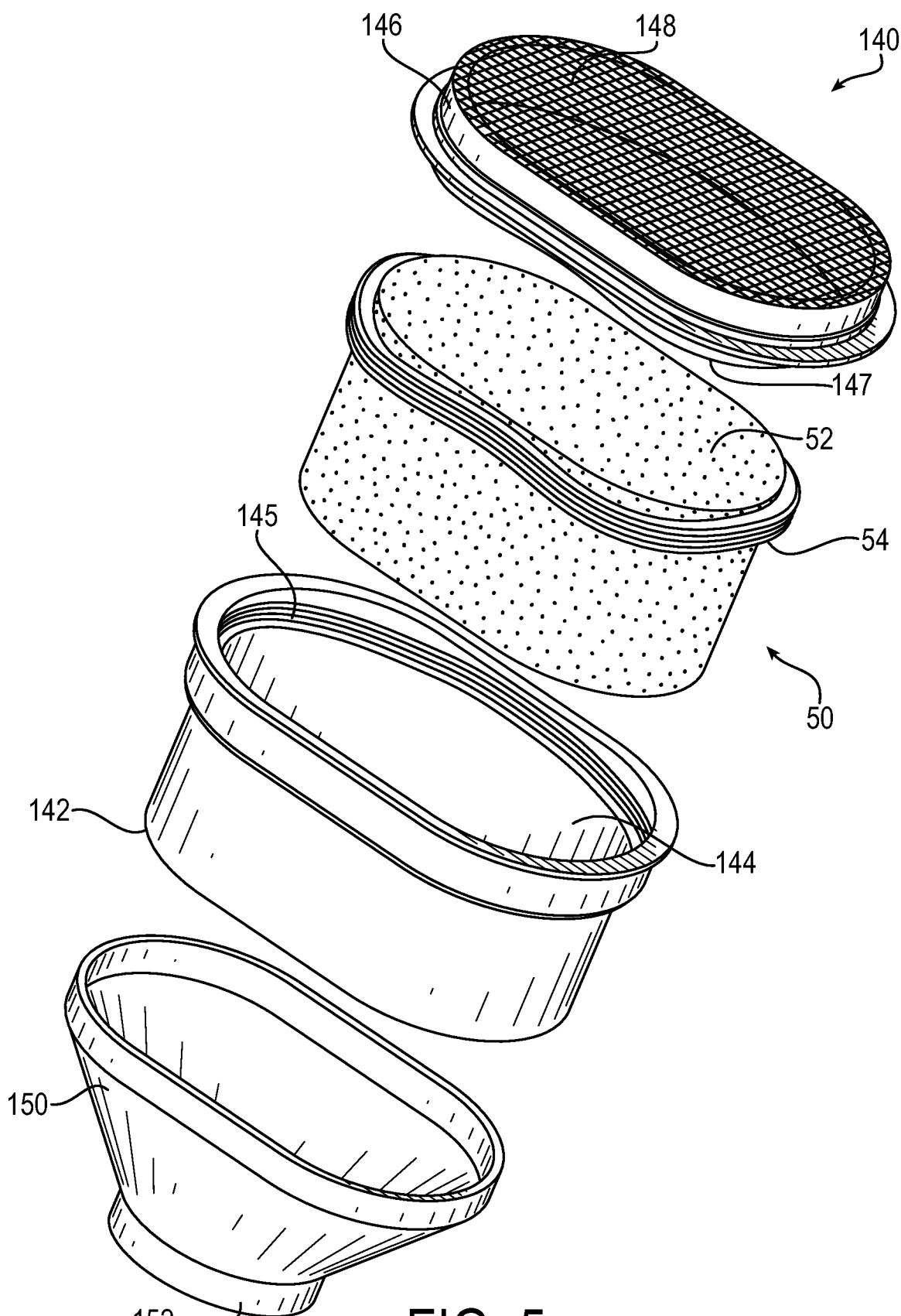
FIG. 5 is a drawing depicting an isometric and exploded view of an exemplary filter assembly in accordance with embodiments of the present invention.
Figure 6:
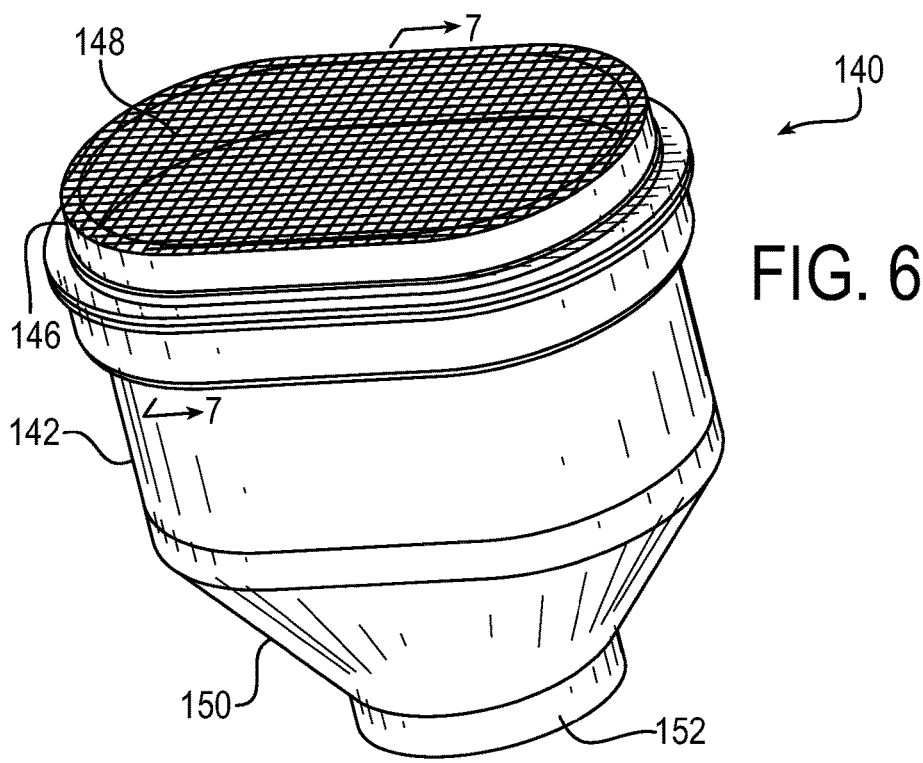
FIG. 6 is a drawing depicting an isometric view of the filter assembly of FIG. 5 as assembled.
Figure 7:
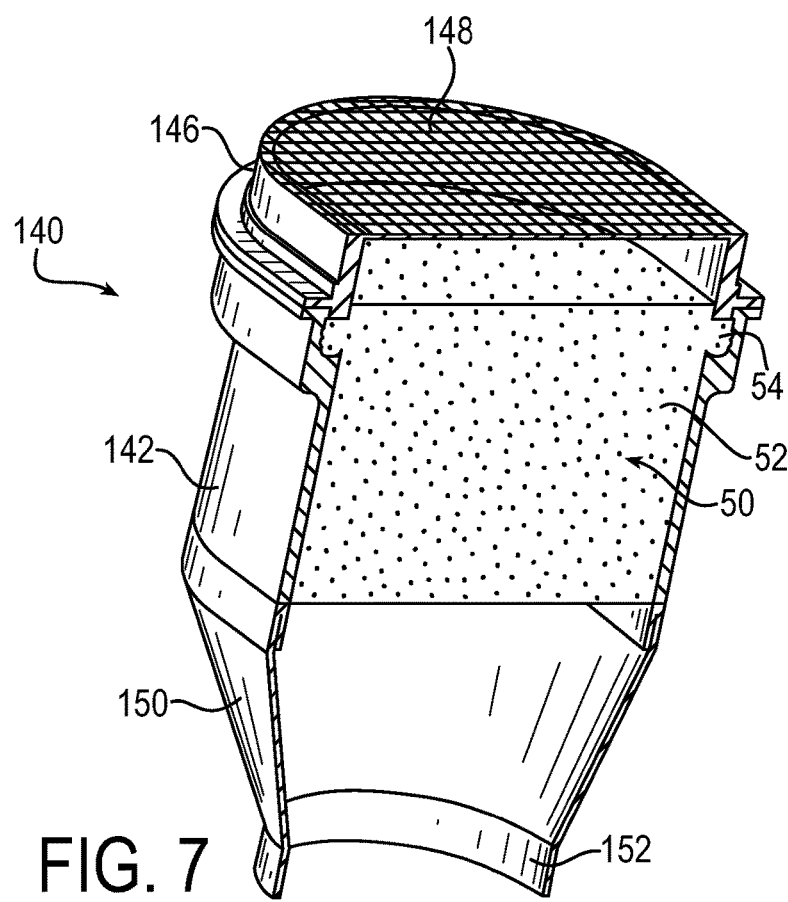
FIG. 7 is a drawing depicting an isometric cut-away view of the filter assembly of FIG. 6.
Figure 8:
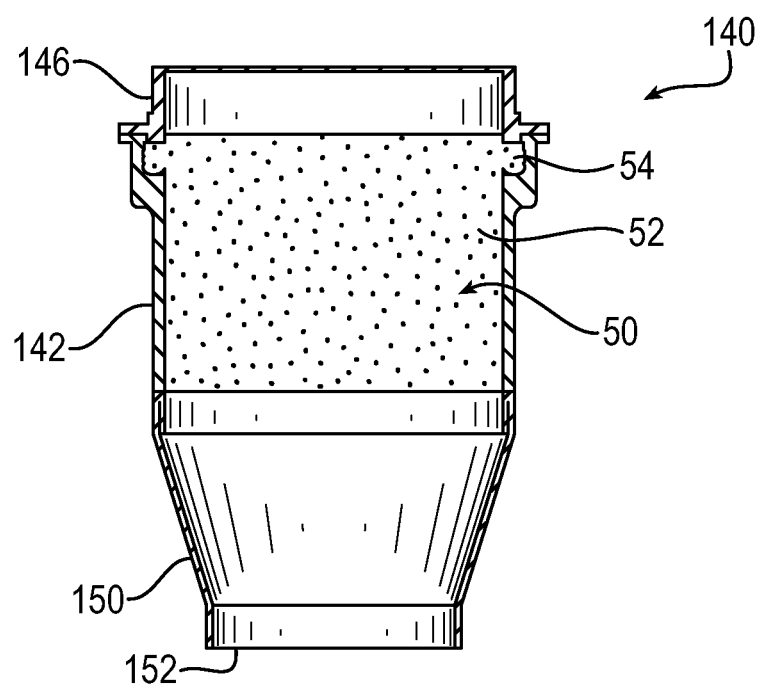
FIG. 8 is a drawing depicting a side cross-sectional view of the filter assembly of FIG. 6.
Figure 9:
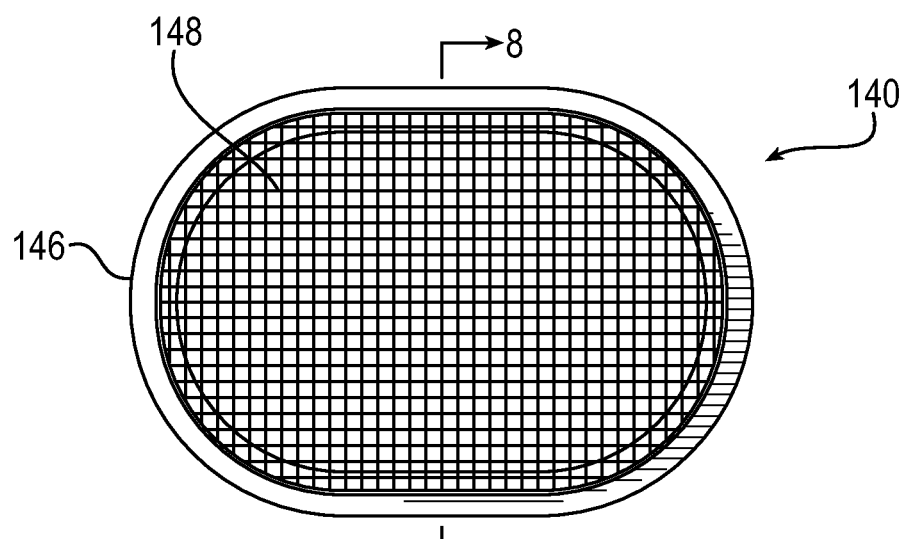
FIG. 9 is a drawing depicting a top view of the filter assembly of FIG. 6.
Figure 10:
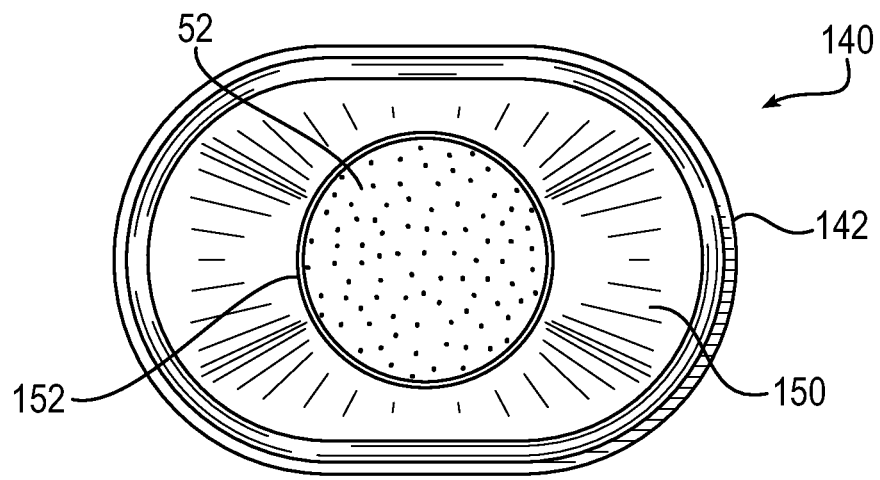
FIG. 10 is a drawing depicting a bottom view of the filter assembly of FIG. 6.
Figure 11:
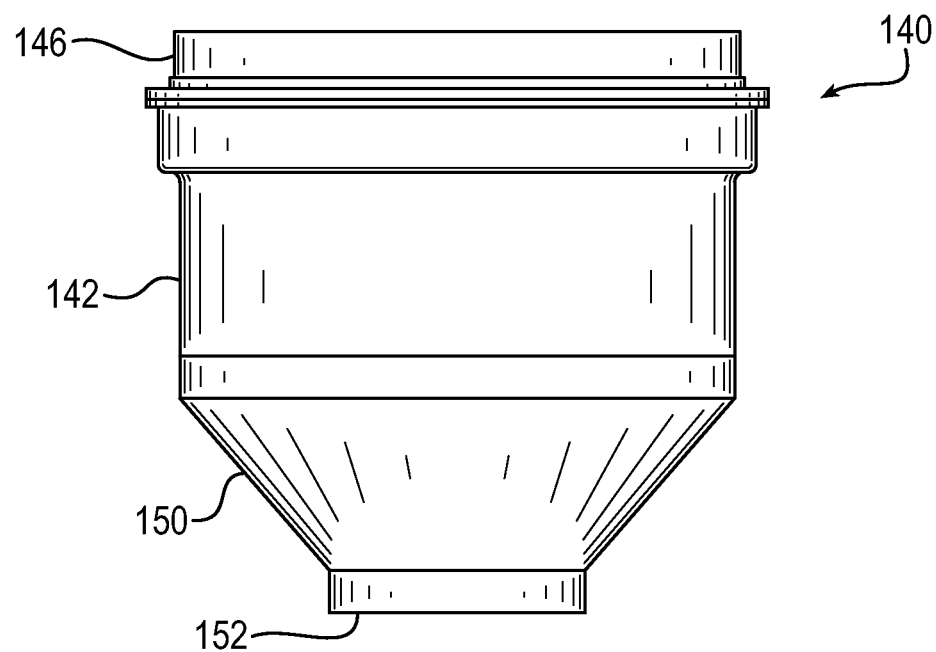
FIG. 11 is a drawing depicting a front view of the filter assembly of FIG. 6.

FIG. 5 is a drawing depicting an isometric and exploded view of an exemplary filter assembly 140 in accordance with embodiments of the present invention. FIG. 6 is a drawing depicting an isometric view of the filter assembly of FIG. 5 as assembled, and FIGS. 7-11 depict additional various views of the exemplary filter assembly 140. The exemplary filter assembly 140 is described in connection with the filter element 50 of FIGS. 3 and 4, having an ovular circular cross-sectional shape and an undercut seal configuration. It will be appreciated, however, that comparable principles of the filter assembly may be employed with respect to the filter element 10 of FIGS. 1 and 2, having a circular cross-sectional shape and a stepped seal configuration, or with any other suitably shaped filter element and its configured components. In addition, in the example of FIGS. 5-11, the gripping component, which as referenced above is optional, is not present in this embodiment.

The filter assembly 140 generally may be configured as an air filter, and the example of FIGS. 5-11 is described principally with respect to filtering an air flow. It will be appreciated, however, that comparable principles may be applied as to filters of various gases or liquids that may be constructed. In the example of FIGS. 5-11, the filter assembly 140 may include a filter housing body 142, configured as a canister to receive therein a filter element, such as filter element 10 or 50 (filter element 50 is shown) or other comparable filter element. An inner surface 144 of the filter housing may be configured to receive the sealing element of the filter element. For an enhanced assembly, such inner surface 144 may include wave seal mating groove 145 that is shape commensurate with the sealing element 54. The filter element 50 is thus received within the filter housing body 142 with the sealing element 54 providing a seal against the inner surface 144 via the mating groove 145 of the filter housing body 142.

The filter assembly 140 further may include a filter head or filter housing cover 146, which covers or caps the filer housing 142 so as to enclose the filter element 50 within the filter housing and filter head. The filter housing cover 146 may include locating ridge 147 that is shaped and configured to conform to the sealing element 50 of the filter element, so as to provide a seal closed fit. Fluid flow, such as air flow for example, proceeds through the filter assembly as follows. The filter head 146 may include and inlet passages 148 that receives an inlet air flow. In this particular example, the inlet passages 148 are configured as a plurality of openings in the filter cover 146 that permit the passage of air. Other inlet configuration may be employed, such as for example inlet tubing that provides air through a generally closed filter housing. The inlet passages may communicate a flow of fluid to the first face of the filter media. Air, therefore, may flow through the inlet passage through the filter head, and into the filter element. As the air flows through the filter media from the top face to the bottom face, the filter media filters the air by trapping any contaminants in the air flow.

The filter assembly 140 further may include a housing outlet 150 that is attached to an outlet side of the filter housing body 142. The housing outlet 150 may include an outlet or exhaust passage 152 for an outflow of filter air from the filter assembly 140. After the air passes through the filter media for filtering, the air then flows out of the filter assembly through the outlet or exhaust passage 152 attached to the base of the filter housing body 142. The outlet passage may receive the flow of fluid from the second face of the filter media, and may be connect to any suitable downstream conduits for the flow of air from the filter assembly 140 to any air-use components. Exemplary usages may include providing air into a vehicle engine, particularly for a turbo engine vehicle function.

It will be appreciated that the housing elements shown in FIGS. 5-11, including the filter housing body 142, the filter housing cover 146, and the housing outlet 150 are but examples. The configuration of such elements may be varied as warranted for any particular application. In other exemplary embodiments, a secondary filter element may be added either upstream or downstream of the filter assembly 140 so as to provide additional filtering as may be warranted by any particular application.

Figure 12:
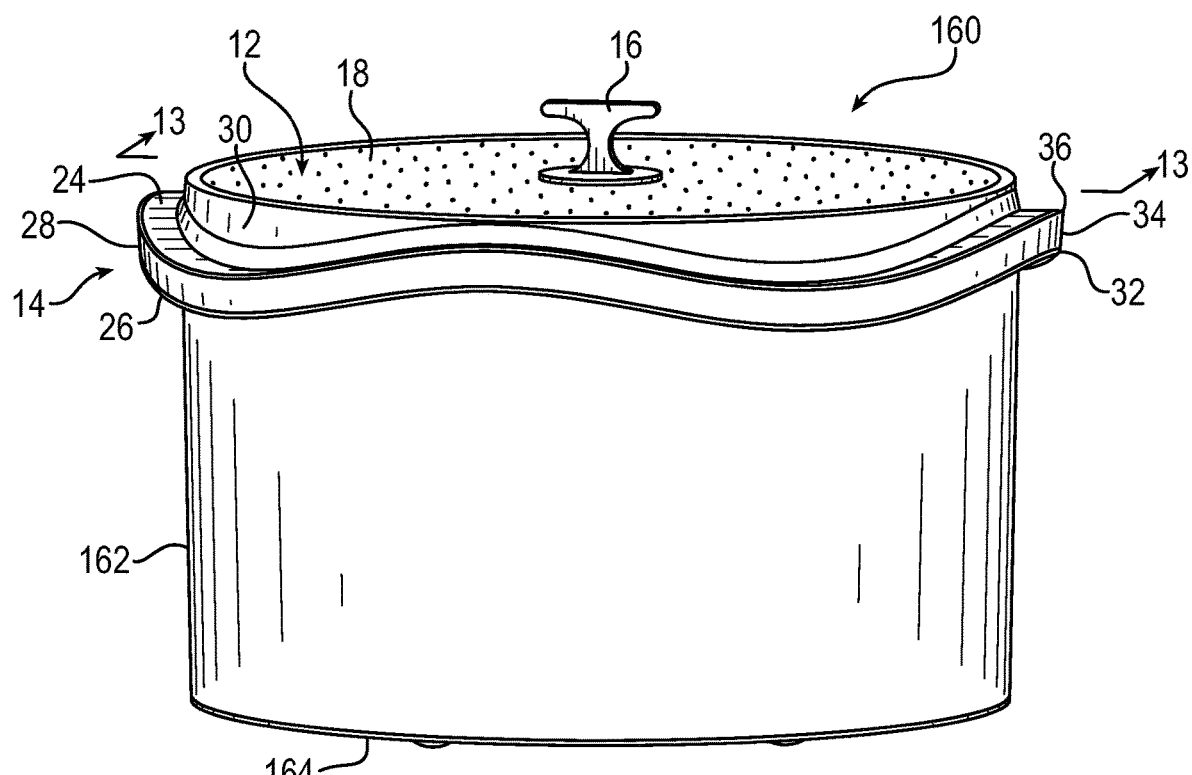
FIG. 12 is a drawing depicting an isometric view of a third exemplary filter element in accordance with embodiments of the present invention.
Figure 13:
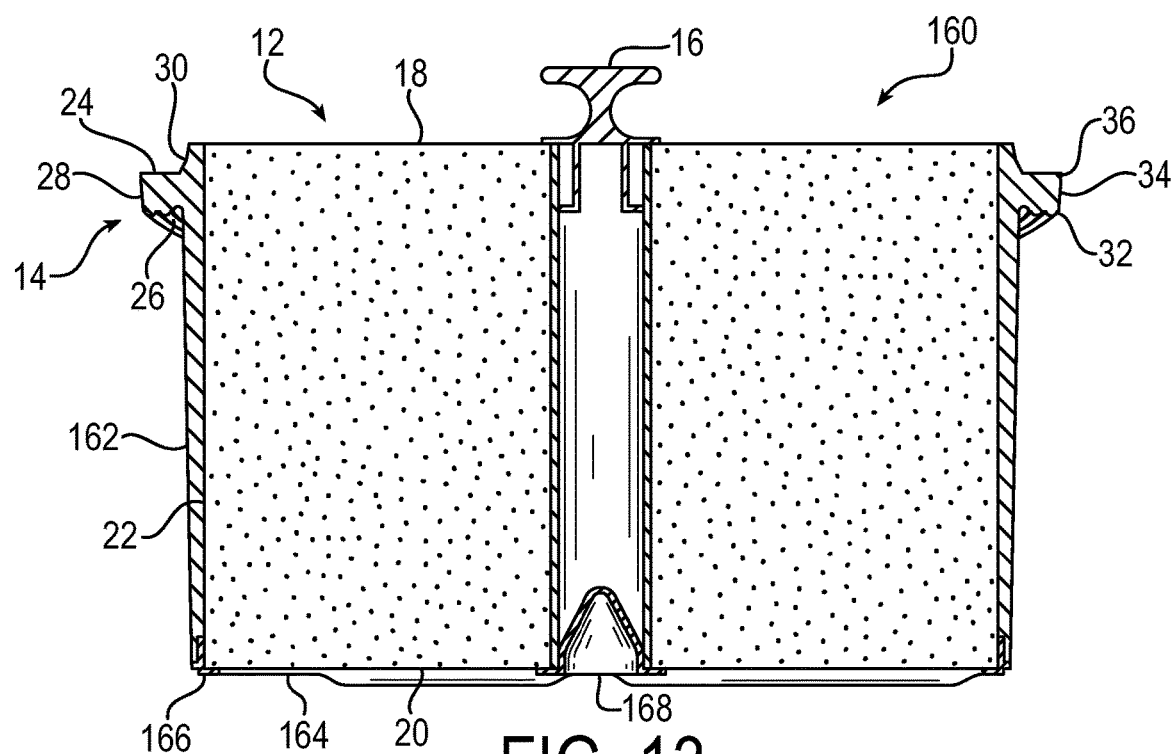
FIG. 13 is a drawing depicting a side cross-sectional view of the exemplary filter element of FIG. 12.

FIG. 12 is a drawing depicting an isometric view of a third exemplary filter element 160 in accordance with embodiments of the present invention. FIG. 13 is a drawing depicting a side cross-sectional view of the exemplary filter element 160 of FIG. 12. The embodiment of FIGS. 12 and 13 is comparable in shape and orientation to the embodiment of FIGS. 1 and 2, with additional features as detailed below. Accordingly, like references numerals in FIGS. 12 and 13 are used for comparable components as the embodiment of FIGS. 1 and 2. It will be appreciated, however, that the additional features of FIGS. 12 and 13 may be employed with any suitable filter element, including for example the oval shaped filter element of FIGS. 3 and 4 having a sealing element configured as the sealing element 54. In addition, the filter element 160 may be employed in any of the embodiments of the filter assembly of FIGS. 5-11.

Accordingly, the filter element 160 similarly may include a filter media 12, a sealing element 14, and an optional gripping component 16. In the example of FIGS. 12 and 13, the filter media 12 is configured in a cylindrical form with a generally circular cross-section, although again any suitable cross-sectional shape may be employed. The filter media 12 runs in a longitudinal direction along a longitudinal axis from a first or top face 18 to an opposite second or bottom face 20 (see particularly FIG. 13). As in previous embodiments, it will be appreciated that the descriptive terms "top" and "bottom" with respect to the faces of the filter element are used for purposes of illustration based on the orientation in the figures. More generally, therefore, the terms first face and second face are opposing faces that are interchangeable and reversible, and the filter element may be oriented in ways other than vertical, with the undulations being offset from either of the opposing faces, without regard to any specific orientation of the filter element.

The filter media 12 may have an outer surface 22 (see particularly FIG. 13) that runs in the longitudinal direction perpendicular to the first and second faces between the first and second faces 18 and 20. In the embodiment of FIGS. 12 and 13, sealing element 14 is extended into a coating of impermeable material 162, such as a urethane coating or similar material that extends over the outer surface 22 of the filter media from the first surface 18 to the second surface 20. The sealing element 14 and the coating 162 may be formed during a common molding process as a unitary element formed of the same material. The unitary sealing element 14 and outer coating 162 is therefore fixed to the outer surface 22 of the filter media 12. In exemplary embodiments, the unitary sealing element and coating 162 is fixed to the outer surface 22 by direct bonding during the manufacturing process as described above.

With the additional coating 162, the embodiment of FIGS. 12 and 13 further may include a protective frame 164 configured to provide some support and protection for the additional coating 162. Features of the support frame 164 may be seen particularly in the cross-sectional view of FIG. 13. The frame 164 may be made of any suitable rigid material, such as a rigid plastic material or other rigid materials. The frame 164 may extend over at least a portion of the second face 20 (or the first face 18) of the filter media. The support frame 164 further may include a corner portion 166 that extends around an edge of the second face 20 (or the first face 18) and along a portion of the outer surface 22 of the filter media, and into and/or around a portion of the coating 162 adjacent to the second face 20 (or first face 18). In this manner, the frame 164 provides protection of the coating 162 from damage at an edge of the coating where wear and damage may be most likely to occur.

The sealing element 14 may be configured similarly as in the embodiment of FIGS. 1 and 2, with a first or top edge 24, a second or bottom edge 26, and an outer side 28 that is opposite to an inner side that is bonded to the filter media. The sealing element may 14 likewise may be configured in this embodiment as an undulating sealing element, also referred to as a wave seal, comparably as described above and in which at least one of the first or second edges 24 or 26 is non-planar. In addition, similarly as in the example of FIGS. 1 and 2, the sealing element 14 is located on the outer surface 22 of the filter media 12 offset from the first or top face 18 and/or the second or bottom face 20 on the air inlet side to form the comparable offset region 30. Note that in the embodiment of FIGS. 12 and 13, the offset region 30 is covered by the coating 162. The outer side 28 of the sealing element 14 also may have a non-planar or otherwise non-uniform configuration to enhance the effectiveness of the seal. In the example of FIGS. 12 and 13, the outer side 28 again may have essentially a stepped configuration with a plurality of ridges 32, 34, and 36 of differing diameters relative to a central longitudinal axis of the filter element, although. Any suitable number of ridges may be employed. As referenced above, the sealing element also may be configured comparably as the sealing element 54 of FIGS. 3 and 4, similarly extended into a coating around filter media.

In addition to the gripping component 16, the filter element 160 further may include a bottom seal or plug 168 (see FIG. 13). The plug 168 may be attached to the second face 20 of the filter media positioned opposite from the gripping component 16, so as to prevent contaminants from entering into the hollow central region of the filter media that is formed during manufacturing.

The wave seal configuration of this disclosure has advantages over conventional configurations. Offsetting the wave sealing element location from the top face of the filter media has resulted in enhanced performance. Additionally, conventional wave seals have been embedded within them a groove or similar undercut in the filter media or filter housing, and embedding the sealing element in the filter media or housing conventionally has employed an additional o-ring in the groove to act as an energizing element to enhance the sealing efficacy. In contrast, by direct bonding the sealing element to an outer surface of the filter media as done in filter elements 10/50, an effective seal is formed against the filter housing without the use of any additional o-ring or comparable secondary energizing element. The present invention, therefore, provides for improved sealing with ease of installation over conventional configurations. Testing has shown comparable restriction and dust holding capacity of the present invention as compared to conventional configurations, with up to 99.9% efficiency in filtering performance.

An aspect of the invention, therefore, is a filter element for use in a filter assembly including the filter element contained within a filter housing. The filter element includes a filter media having a first face and a second face opposite to the first face, and further including an outer face extending in a longitudinal direction perpendicular to the first and second faces from the first face to the second face; and an undulating sealing element fixed to the outer face of the filter media at a location closer to the first face than the second face, and offset from the first face. The filter element may include one or more of the following features, either individually or in combination.

In an exemplary embodiment of the filter element, undulations of the sealing element have an amplitude along the longitudinal direction from a minimum position closest to the second face to a maximum position closest to the first face.

In an exemplary embodiment of the filter element, undulations of the sealing element define an offset region of the outer face of the filter media, the offset region being defined by the sealing element with the maximum position being offset at a range of 5%-15% from the first face relative to an entire longitudinal length of the filter media, and the sealing element at the minimum position being offset at a range of approximately 40%-60% from the first face relative to the entire longitudinal length of the filter media.

In an exemplary embodiment of the filter element, the sealing element has an outer side that is non-planar.

In an exemplary embodiment of the filter element, the outer side of the sealing element has a stepped configuration including a plurality of ridges of differing diameters relative to a central longitudinal axis of the filter element.

In an exemplary embodiment of the filter element, the outer side of the sealing element has a grooved configuration including an undercut forming a stem that extends from a sealing base, and the stem supports a sealing block.

In an exemplary embodiment of the filter element, the sealing element is directly bonded to the outer face of the filter media.

In an exemplary embodiment of the filter element, the sealing element is made of urethane.

In an exemplary embodiment of the filter element, the sealing element has two or more undulations.

In an exemplary embodiment of the filter element, the filter media has a circular cross section.

In an exemplary embodiment of the filter element, the filter media has an ovular cross section.

In an exemplary embodiment of the filter element, the filter element further includes a gripping component that attached to the first face of the filter media.

In an exemplary embodiment of the filter element, the gripping component comprises a base plate that rests against the first face of the filter media, an anchor that extends from the base plate into a portion of the filter media, and a grip for gripping by a user that extends from the base plate away from the first face of the filter media.

In an exemplary embodiment of the filter element, the filter media is pleated or fluted.

In an exemplary embodiment of the filter element, the outer surface of the filter media is impermeable to fluid that flows through the filter media from the first face to the second face.

In an exemplary embodiment of the filter element, the sealing element is extended into a coating that extends over the outer surface of the filter media from the first face to the second face.

In an exemplary embodiment of the filter element, the sealing element and the coating are configured as a unitary piece of a same material.

In an exemplary embodiment of the filter element, the same material is urethane.

In an exemplary embodiment of the filter element, the filter element further includes a frame that is located adjacent an edge of the coating.

In an exemplary embodiment of the filter element, the frame includes a corner portion that extends around the edge of the second face and along a portion of the outer surface of the filter media, and into and/or around a portion of the coating adjacent to the second face.

In an exemplary embodiment of the filter element, the filter element further includes a plug attached to the second face of the filter media.

Another aspect of the invention is a filter assembly. In exemplary embodiments, the filter assembly includes a filter element according to any of the embodiments, a filter housing body configured to receive the filter element, and a filter housing cover configured to cover the filter housing body, wherein the filter element is enclosed by the filter housing body and filter housing cover. The filter assembly may include one or more of the following features, either individually or in combination.

In an exemplary embodiment of the filter assembly, an inner surface of the filter housing body has a mating groove that is configured to receive the sealing element of the filter element.

In an exemplary embodiment of the filter assembly, the filter housing cover includes an inlet passage for communicating a flow of a fluid to the first face of the filter media, and the filter assembly further comprises a filter housing outlet attached to the filter housing body that includes an outlet passage for receiving the flow of the fluid from the second face of the filter media.

In an exemplary embodiment of the filter assembly, the filter housing cover further includes a locating ridge that is shaped to conform to the sealing element of the filter element.

In an exemplary embodiment of the filter assembly, the fluid is air.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A filter element for use in a filter assembly including the filter element contained within a filter housing, the filter element comprising:
a filter media having a first face and a second face opposite to the first face, and further including an outer face extending in a longitudinal direction perpendicular to the first and second faces from the first face to the second face; and
an undulating sealing element directly fixed to the outer face of the filter media at a location between the first and second faces and closer to the first face than the second face, and at least a portion along a length of the sealing element is offset from the first face so as to define an offset region on the outer face of the filter media that is between the undulating sealing element and the first face.

2. The filter element of claim 1, wherein undulations of the sealing element have an amplitude along the longitudinal direction from a minimum position closest to the second face to a maximum position closest to the first face.

3. The filter element of claim 2, wherein the undulations of the sealing element define an offset region of the outer face of the filter media, the offset region being defined by the sealing element with the maximum position being offset at a range of 5%-15% from the first face relative to an entire longitudinal length of the filter media, and the sealing element at the minimum position being offset at a range of approximately 40%-60% from the first face relative to the entire longitudinal length of the filter media.

4. The filter element of claim 1, wherein the sealing element has an outer side that is non-planar.

5. The filter element of claim 4, wherein the outer side of the sealing element has a stepped configuration including a plurality of ridges of differing diameters relative to a central longitudinal axis of the filter element.

6. The filter element of claim 4, wherein the outer side of the sealing element has a grooved configuration including an undercut forming a stem that extends from a sealing base, and the stem supports a sealing block.

7. The filter element of claim 1, wherein the sealing element is directly bonded to the outer face of the filter media.

8. The filter element of claim 1, wherein the sealing element is made of urethane.

9. The filter element of claim 1, wherein the sealing element has two or more undulations.

10. The filter element of any of claim 1, wherein the filter media has a circular cross section.

11. The filter element of claim 1, wherein the filter media has an ovular cross section.

12. The filter element of claim 1, further comprising a gripping component that attached to the first face of the filter media.

13. The filter element of claim 12, wherein the gripping component comprises a base plate that rests against the first face of the filter media, an anchor that extends from the base plate into a portion of the filter media, and a grip for gripping by a user that extends from the base plate away from the first face of the filter media.

14. The filter element of claim 1, wherein the filter media is pleated or fluted.

15. The filter element of claim 1, wherein the outer surface of the filter media is impermeable to fluid that flows through the filter media from the first face to the second face.

16. The filter element of claim 1, wherein the sealing element is extended into a coating that extends over the outer surface of the filter media from the first face to the second face.

17. The filter element of claim 16, wherein the sealing element and the coating are configured as a unitary piece of a same material.

18. The filter element of claim 17, wherein the same material is urethane.

19. The filter element of claim 16, further comprising a frame that is located adjacent an edge of the coating.

20. The filter element of claim 19, wherein the frame includes a corner portion that extends around an edge of the second face and along a portion of the outer surface of the filter media, and into and/or around a portion of the coating adjacent to the second face.

21. The filter element of claim 1, further comprising a plug attached to the second face of the filter media.

22. A filter assembly comprising:
a filter element according to claim 1;
a filter housing body configured to receive the filter element; and
a filter housing cover configured to cover the filter housing body, wherein the filter element is enclosed by the filter housing body and filter housing cover.

23. The filter assembly of claim 22, wherein an inner surface of the filter housing body has a mating groove that is configured to receive the sealing element of the filter element, and the sealing element compresses within the mating groove.

24. The filter assembly of claim 22, wherein the filter housing cover includes an inlet passage for communicating a flow of a fluid to the first face of the filter media, and the filter assembly further comprises a filter housing outlet attached to the filter housing body that includes an outlet passage for receiving the flow of the fluid from the second face of the filter media.

25. The filter assembly of claim 24, wherein the filter housing cover further includes a locating ridge that is shaped to conform to the sealing element of the filter element.

26. A filter element for use in a filter assembly including the filter element contained within a filter housing, the filter element comprising:
a filter media having a first face and a second face opposite to the first face, and further including an outer face extending in a longitudinal direction perpendicular to the first and second faces from the first face to the second face, wherein the filter media has a curved cross section that is uniform from the first face to the second face; and
an undulating urethane sealing that is compressible within a mating groove of the filter housing, the urethane sealing element being directly bonded to the outer face of the filter media at a location closer to the first face than the second face, and offset from the first face.

27. The filter element of claim 26, wherein undulations of the sealing element have an amplitude along the longitudinal direction from a minimum position closest to the second face to a maximum position closest to the first face.

28. The filter element of claim 27, wherein the undulations of the sealing element define an offset region of the outer face of the filter media, the offset region being defined by the sealing element with the maximum position being offset at a range of 5%-15% from the first face relative to an entire longitudinal length of the filter media, and the sealing element at the minimum position being offset at a range of approximately 40%-60% from the first face relative to the entire longitudinal length of the filter media.

29. The filter element of claim 26, wherein the sealing element has two or more undulations.

30. The filter element of claim 26, wherein the filter media has an ovular cross section.

31. The filter element of claim 26, wherein the filter media has a circular cross section.

32. The filter element of claim 26, wherein the filter media is pleated or fluted.

33. The filter element of claim 26, wherein the outer surface of the filter media is impermeable to fluid that flows through the filter media from the first face to the second face.

34. The filter element of claim 26, wherein the sealing element is extended into a coating that extends over the outer surface of the filter media from the first face to the second face.

35. The filter element of claim 34, wherein the sealing element and the coating are configured as a unitary piece of a same material.

36. The filter element of claim 35, wherein the same material is urethane.

37. The filter element of claim 34, further comprising a frame that is located adjacent an edge of the coating.

38. The filter element of claim 37, wherein the frame includes a corner portion that extends around an edge of the second face and along a portion of the outer surface of the filter media, and into and/or around a portion of the coating adjacent to the second face.

39. The filter element of claim 26, further comprising a plug attached to the second face of the filter media.

40. The filter element of claim 1, wherein the undulating sealing element has an inner surface directly fixed to the outer face of the filter media.

41. The filter element of claim 26, wherein the undulating sealing element has an inner surface directly fixed to the outer face of the filter media.

42. A filter element for use in a filter assembly including the filter element contained within a filter housing, the filter element comprising:
   a filter media having a first face and a second face opposite to the first face, and further including an outer face extending in a longitudinal direction perpendicular to the first and second faces from the first face to the second face; and
   an undulating sealing element directly fixed to the outer face of the filter media at a location between the first and second faces and closer to the first face than the second face, wherein undulations of the undulating sealing element extend from a minimum to a maximum so as to define an offset region on the outer face of the filter media that is between the undulating sealing element and the first face.

43. The filter element of claim 42, wherein the undulating sealing element further defines non-offset regions in which the undulating sealing element extends at least to the first face.

44. The filter element of claim 43, wherein at the non-offset regions the undulating sealing element abuts the first face.

45. A filter assembly comprising:
   a filter element according to claim 42;
   a filter housing body configured to receive the filter element; and
   a filter housing cover configured to cover the filter housing body, wherein the filter element is enclosed by the filter housing body and filter housing cover.

* * * * *